United States Patent

[11] 3,609,535

| [72] | Inventors | Thomas O. Paine<br>Administrator of the National Aeronautics and Space Administration with respect to an invention of;<br>David E. Roberts, Joshua Tree, Calif.;<br>Sidney M. Grieve, Van Nuys, Calif. |
|---|---|---|
| [21] | Appl. No. | 889,479 |
| [22] | Filed | Dec. 31, 1969 |
| [45] | Patented | Sept. 28, 1971 |

[54] APPARATUS FOR TESTING WIRING HARNESS BY VIBRATION GENERATING MEANS
2 Claims, 1 Drawing Fig.

[52] U.S. Cl. ........................................... 324/52
[51] Int. Cl. ............................................ G01r 31/02, G01r 31/08
[50] Field of Search ................................ 324/51, 52, 54, 158 F; 73/69, 71.5

[56] References Cited
UNITED STATES PATENTS
2,759,055  8/1956  Foss .................. 324/158 F UX

| 3,183,435 | 5/1965 | Donville et al. | 324/51 |
| 3,104,543 | 9/1963 | Kaminski | 73/69 |
| 3,356,940 | 12/1967 | La Frentz | 324/52 |
| 2,283,285 | 5/1942 | Pohlman | 73/71.5 X |

FOREIGN PATENTS

| 767,558 | 2/1957 | Great Britain | 324/52 |

Primary Examiner—Gerard R. Strecker
Attorneys—Marvin J. Marnock, Marvin F. Matthews and G. T. McCoy ABSTRACT: An apparatus which tests wiring harnesses, terminal trips, sockets and plugs, which includes an audio oscillator, an amplifier, and a very substantial high-power speaker horn directed at the apparatus being tested, which is configured immediately in front of the horn, and further including a DC voltage source in series with a load impedance utilizing selected portions of the wiring harness and other associated equipment to complete a circuit therewith, and an oscilloscope viewing noise developed across the load impedance indicative of a malfunction of certain portions of said apparatus.

PATENTED SEP28 1971
3,609,535
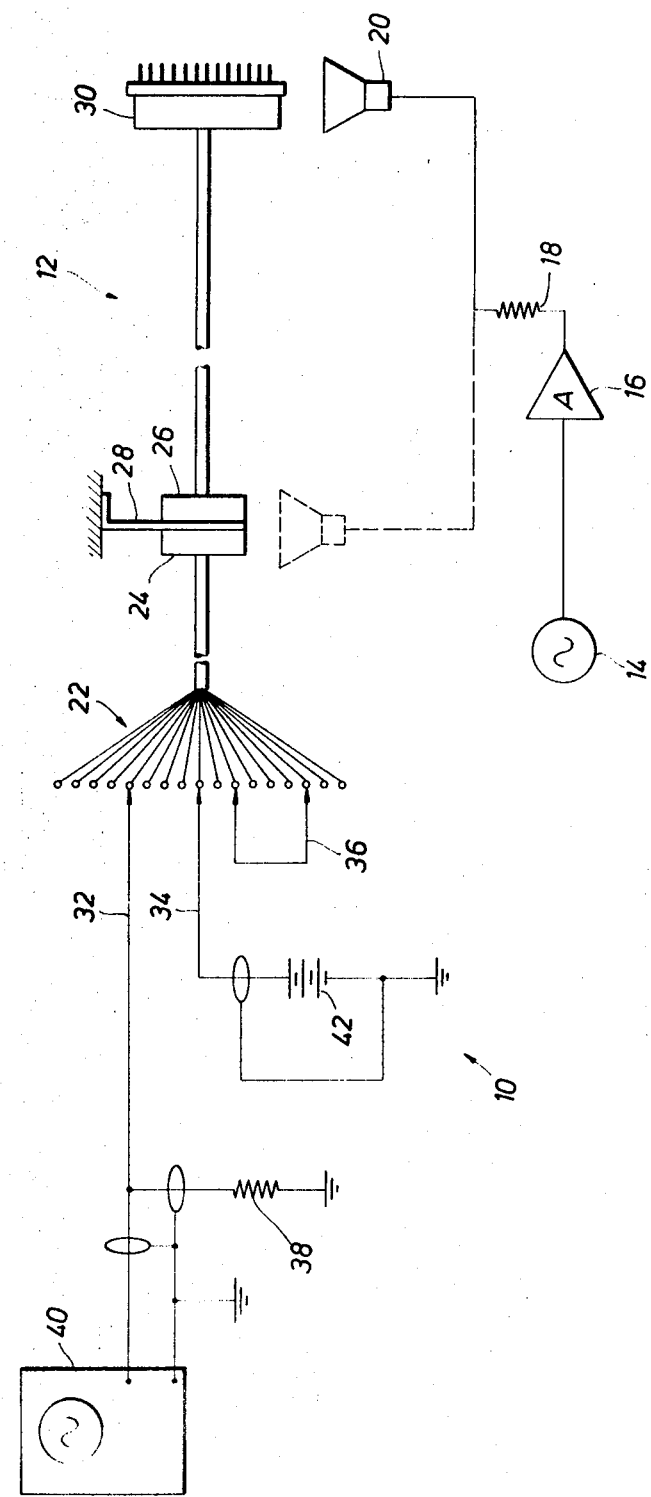
David E. Roberts
Sidney M. Grieve
INVENTORS
BY
Marvin J. Marnock
ATTORNEYS

APPARATUS FOR TESTING WIRING HARNESS BY VIBRATION GENERATING MEANS

ORIGIN OF THE INVENTION

ORIGIN OF THE INVENTION

The invention described herein was made in the performance of work under a NASA Contract and is subject to the provisions of Section 305 of the National Aeronautics and Space Act of 1958, Public Law 85–568 (72 Stat. 435; 42 U.S.C. 2457).

SUMMARY OF PROBLEM AND INVENTION

In the fabrication of wiring harnesses and the associated paraphernalia, certain defects of manufacture or assembly are latent, and become critical in the event that the wiring harness is subjected to a difficult environment. It is not uncommon for noise signals to be created in a wiring system having values ranging in the millivolt range. This will obscure valuable data transferred through the wiring system and in some cases, become so extreme as to be unacceptable. Numerous testing techniques have been developed heretofore for the wiring harnesses and associated equipment, which have had some measure of success in detecting flaws of workmanship and assembly. However, such tests are fairly gross, and may detect the difference between an open circuit and a perfect circuit, but such tests have not succeeded in detecting minute flaws. The apparatus of the present invention is particularly useful for detection of minute flaws which create spurious signals in the wiring system having magnitudes of perhaps as small as 1 millivolt, and substantially larger. Quite often, such wiring systems are utilized in airframe systems, including navigational and computational systems wherein accurate data communication is essential to operation of expensive and complicated equipment.

It is with the foregoing problem in view that the present apparatus is summarized as including an acoustic vibration test apparatus which utilizes a very large loudspeaker to inflect an audiofrequency vibration on the apparatus being tested. The wiring harness, terminal strips, and other paraphernalia are mounted directly in front of a substantially large horn or speaker. An audio oscillator is connected with a very large amplifier capable of outputting perhaps 250 watts. The power is applied to the speaker and the frequency range may be swept to detect resonant points in the apparatus.

A DC voltage source and load resistor are connected utilizing selected portions of the wiring system, while an oscilloscope is used to view noise developed across the load resistor when connected with the wiring system. A visual reading of the acoustical noise created by the vibration will show the degree of integrity established in the equipment and the extent to which corrections in material or workmanship are required.

Many objects and advantages of the present invention will become more readily apparent from a consideration of the following specification and included drawing, wherein:

The single view is a schematic wiring diagram of the acoustic vibration test apparatus of the present invention connected with a wiring harness including a terminal strip, plug and socket assembled together.

Attention is first directed to the schematic wiring diagram forming the single view, which illustrates the acoustic vibration test apparatus of the present invention. The test apparatus is indicated by the numeral 10, generally, and a wiring harness and associated apparatus undergoing test is indicated by the numeral 12. The test apparatus subjects the wiring harness to electromechanical vibration and monitors the noise level detected as an indication of defects in workmanship or construction. More particularly, the apparatus sweeps a wide frequency range to sound out resonant points in the apparatus with a view of maintaining and servicing the equipment. This qualification test can be implemented before the installation of the wiring system 12 or at periodic intervals during routine inspection.

Considering the invention in detail, the numeral 14 indicates an audiofrequency oscillator which is tunable from perhaps as low as 5 hertz to perhaps 100,000 hertz. The audio oscillator 14 is conventional bought equipment and provides an output signal to an amplifier 16 which raises the amplitude of the output signal sufficiently to provide an output of perhaps 200 or 300 watts. The amplifier 16 is likewise conventional equipment, well known in the art, and may be, by way of example and not limitation, a high fidelity audio amplifier of sufficient power. The output of the amplifier 16 is communicated through a series load resistor 18 to a very large loud speaker 20. Again, the loudspeaker is a bought item and need only be capable of handling the power levels herein described to function satisfactorily in use with the present invention. Exemplary equipment found quite satisfactory in times past included a Hewlett-Packard Model 205 audio oscillator, a McIntosh amplifier, and a James Lansing Model 375H loudspeaker. Suitable operating levels at perhaps 40 volts output from the amplifier 16 have been readily utilized.

The wiring harness 12 should be considered now in detail. The wiring harness preferably includes a number of individual wires indicated at 22. As will be understood, the number may vary from two up to a very substantial number of conductors. They may be shielded or unshielded, or a mixture thereof, depending on the function of the wiring harness 12. The numeral 24 indicates a suitable plug while the numeral 26 indicates a socket which is carried on an acceptable mounting bracket 28. The plug-and-socket combination is indicated generically in the drawings inasmuch as several configurations of connectors are known today. The number of pins is subject to variation as is the gauge of the various pins in the connector arrangement, and the sources of manufacture may likewise vary. The invention of the present invention is to test the wiring harness 12 exactly as it is found installed in the equipment. Hence, the connectors will vary quite widely in nature, size, capacity and other details.

The wiring harness may be of indefinite length. It may be quite short or long as needed. Moreover, it may terminate in a terminal strip as indicated at 30, although this is not required. The terminal board 30 may likewise again include a very few terminals, or a larger number, depending on the number of wires and conductors found in the wiring harness 12. Details concerning the terminal board likewise may vary widely inasmuch as the equipment is intended to test the wiring harness and associated equipment as a unity with it connected in a range just as it is found in the equipment for which it is built.

The speaker 20 is positioned just a few inches from the various portions of the wiring harness 12. Thus, the dotted line position of the single drawing shows the speaker 20 positioned immediately adjacent the plug 24 and the socket 26. The full line position shows its position immediately adjacent the terminal board 30.

Considering the remaining portions of the acoustic vibration test apparatus, the numeral 32 indicates a conductor which is connected by suitable alligator clip or other temporary connector with one of the conduits in the wiring harness at 22. The numeral 34 indicates an additional conductor which is connected to another of several conduits in the wiring harness. The numeral 36 indicates a jumper having two or more alligator clamps on the ends for joining several of the loose conductors in the harness together. The conductor 32 is connected to the vertical input of an oscilloscope 40 to display the noise signals obtained by the test apparatus 10. The ground terminal of the scope 40 is connected with the shields surrounding the conductor 32 and the other conductors. The conductor 32 is connected across a load resistor 38 which is preferably a wire wound resistor of perhaps 100,000 ohms resistance. Wire wound resistors are to be preferred over carbon resistors which are susceptible to mechanical noise created in the near vicinity. The resistor 38 serves as an output load impedance means for the signals developed and indicative of mechanical failures in the wiring harness 12.

The conductor 34 is connected to a suitable battery 42 having a terminal voltage of perhaps 6 volts or so. Again, the conductor 34 is shielded with the shield leads being grounded. The negative side of the battery 42 is grounded to complete the circuit. The battery 42 provides a positive terminal communicated through the conductor 34, the wiring harness 12, the conductor 32, and to ground through the load resistor 38. It is helpful to form a completed circuit through the wiring harness with current flow passing through the various conductors, solder junctions, terminals, pins, and other equipment. The several conductors remaining in the harness can be joined by the jumper 36 to alter or somewhat vary the degree of pickup of the unused harness circuit wires. A great variety in the connection of the conductors 32, 34 and 36 may be attained in the wiring harness 12. Thus, the conductors 32 and 34 may be connected together and likewise connected to a single conductor. The conductor is very much in the circuit and is susceptible to the vibrations created by the test apparatus. The terminal strip 30 can be connected with suitable patch wires and the like to complete selected or desired circuits as needed. Again, a great deal of variety can be accomplished through the use of the present invention inasmuch as the wiring harness 12 will vary greatly in complexity and the number of conductors.

In operation, the speaker 20 is positioned perhaps 2 inches or so from the portion of the wiring harness being specifically tested. As shown in full line, the speaker 20 is adjacent the terminal strip 30. A normal testing level would require adjustment of the amplifier 16 to output about 100 watts power so that the sound reaches the level of approximately 100 db. in the vicinity of the terminal strip 30 which is attained approximately 2 inches or so from the speaker 20. The vibrations are coupled into the wiring harness 12, but are particularly sensed or found in the area of the terminal strip 30. The conductors 32 and 34 are moved across the various conductors and readings are observed on the oscilloscope 40. Once the conductors 32 and 34 are temporarily joined to particular conductor in the wiring harness 12, the oscillator 14 is swept across a relatively wide frequency range. One acceptable range is from perhaps subaudio frequencies at perhaps 10 hertz or so to and beyond the range of human hearing, perhaps to 20,000 hertz. The detector means 40 are observed for noise. The vertical scale of the oscilloscope 40 is adjusted so that millivolt noise appears quite large, and preferably, the horizontal time base is extended sufficiently that 60 hertz radiation in the environment of the test is not seen on the oscilloscope. As the frequency range is swept, mechanical resonant points will be encountered if the connections are faulty. Thus, an undersized pin, faulty solder joint, a poor mounting of a pin or socket, and other such mechanical failures will be noted by observing the noise level at the oscilloscope 40. A conductor should be considered satisfactory if the noise level is in the range of 0.5 millivolts or less. Preferably, the noise is so small as to be difficult to see on the oscilloscope 40. However, connections in the wiring harness 12, which appear normal, and which give normal performance without the use of the present test apparatus, may show noise levels as high as 1 volt generated mechanically at the junction on which the high-energy audio sound impinges.

From the foregoing, it will be understood that several conductors in the harness are tested individually. Likewise, the several plugs, sockets, mounting brackets, terminal strips, and other paraphernalia associated with the apparatus are likewise individually tested. That is to say, each such component is placed immediately in front of the horn or speaker 20 for a full and adequate test. The results can be monitored visually, although other equipment such as a strip chart recorder may be used to obtain data from the test apparatus 10.

The foregoing has been directed to the preferred embodiment of the present invention. It has likewise been described in operation, testing a typical wiring harness 12 which may vary widely in configuration and components. Moreover, the severity of the test may likewise be varied inasmuch as the use of the harness 12 at its point of installation may likewise vary.

It is of interest to note that the apparatus of the present invention is particularly capable of locating both defects of material and workmanship which give normal readings absent the vibrations of the present test apparatus. Thus, a test of the harness 12 without the excitation of the equipment described above may yield normal conductor resistance values. Such values are clearly misleading inasmuch as they are established without acoustic excitation. The apparatus of the present invention is able to find, and indeed does function quite admirably in locating, latent malfunctions and faults.

It is worthy of interest to point out the presence of an electromagnetic field acting on the wiring harness undergoing test. Briefly, the speaker forms an electromagnetic field projecting from its structure and acting on the harness. The harness is formed of materials which are responsive to the high-intensity field. The field induces further vibrations in the harness in addition to those which are mechanically or acoustically coupled to the harness. Thus, the test is enhanced by the additional mode of coupling vibrations to the harness to obtain optimum testing.

It should be noted that numerous variations and alterations in the structure may be adapted without departing from the scope of the claims. For instance, the indicating means 40 may be the oscilloscope shown in the preferred embodiment, or some other suitable recording or metering device. In further particular, the horn 20 may be of any suitable construction, so long as it couples substantial vibrations to the wiring harness 12. As noted above, the wiring harness 12 and the several mechanical components comprising portions of it may vary widely in detail and complexity and still be tested by the apparatus 10.

The terminology applied to the preferred embodiment is hereby adapted for the claims which are appended hereto.

What is claimed is:

1. Apparatus for testing a wiring harness for faulty connections and breaks wherein said harness includes a plurality of shielded or unshielded conductors and associated terminal devices, said apparatus comprising:

acoustic vibration generating means for outputting acoustic energy acting on a portion of at least one conductor of said wiring harness and having a selected power level; said acoustic vibration generating means comprising a variable frequency oscillator capable of generating electrical signals within the audiofrequency range, an adjustable amplifier means operatively coupled with said oscillator and for amplifying the electrical signals of said oscillator and loudspeaker means electrically coupled with said amplifier mans and positioned immediately adjacent to said portion of the conductor of the harness being tested for directing acoustic waves toward the wiring harness to effect vibration of the conductor;

a load impedance means connected in series with said conductor of said wiring harness;

a DC voltage source adapted for electrical connection with said load resistor and across said conductor to form an electrical circuit therewith;

electrical noise indicating means electrically coupled to said conductor of the wiring harness for providing an indication of electrical noise produced by the vibration of said conductor as induced by said acoustic vibration generating means; and means for sweeping the oscillator signals across the audiofrequency range whereby points of mechanical resonance in the apparatus may be detected as the loudspeaker means is moved along the length of said conductor, said loudspeaker means being characterized by generation of an alternating electromagnetic field in addition to said acoustic energy for further enhancing vibration of said harness.

2. The invention of claim 1 wherein said indicating means is an oscilloscope and said noise is visually observable on said oscilloscope.